(12) United States Patent
Dilluvio et al.

(10) Patent No.: US 9,539,887 B2
(45) Date of Patent: Jan. 10, 2017

(54) TENSIONING STRAP FOR A TOP STACK SEAL

(71) Applicant: Magna Car Top Systems of America, Inc., Auburn Hills, MI (US)

(72) Inventors: Christopher J. Dilluvio, Farmington Hills, MI (US); Wolfgang Richter, Commerce Township, MI (US)

(73) Assignee: MAGNA CAR TOP SYSTEMS OF AMERICA, INC., Auburn Hills, MI (US)

( * ) Notice: Subject to any disclaimer, the term of this patent is extended or adjusted under 35 U.S.C. 154(b) by 91 days.

(21) Appl. No.: 14/511,239

(22) Filed: Oct. 10, 2014

(65) Prior Publication Data

US 2016/0101676 A1    Apr. 14, 2016

(51) Int. Cl.
*B60J 7/12* (2006.01)
*B60J 10/10* (2006.01)

(52) U.S. Cl.
CPC ............... *B60J 7/12* (2013.01); *B60J 7/1204* (2013.01); *B60J 10/10* (2013.01)

(58) Field of Classification Search
CPC .............. B60J 10/10; B60J 7/12; B60J 7/1204
USPC ............................................ 296/121, 107.04
See application file for complete search history.

(56) References Cited

U.S. PATENT DOCUMENTS

| | | | |
|---|---|---|---|
| 2,482,323 A | 9/1949 | Cromwell et al. | |
| 3,206,246 A | 9/1965 | Williams | |
| 3,237,983 A * | 3/1966 | Hollar, Jr. | B60J 7/104 296/107.04 |
| 4,633,509 A * | 12/1986 | Scheinert | H04W 48/12 340/7.24 |
| 4,784,428 A | 11/1988 | Moy et al. | |
| 4,805,956 A * | 2/1989 | Saunders | B60J 7/1657 296/103 |
| 6,295,713 B1 * | 10/2001 | Hilliard | B60J 7/1226 29/446 |
| 7,156,445 B2 | 1/2007 | Taira et al. | |
| 7,594,689 B2 * | 9/2009 | Heselhaus | B60J 7/123 296/107.04 |
| 8,474,899 B2 * | 7/2013 | Moran | B60J 7/12 296/100.18 |
| 2014/0252795 A1 * | 9/2014 | Willard | B60J 7/1247 296/108 |

* cited by examiner

*Primary Examiner* — Pinel Romain
(74) *Attorney, Agent, or Firm* — Brooks Kushman P.C.

(57) ABSTRACT

A support strap for holding a seal strip of a convertible top against one or more body panels of the vehicle. The seal strip has a body panel engaging portion and an attachment portion. A tensioner is operatively attached to the support strap to reduce the flexibility of the support strap and apply pressure to the seal strip to improve the effectiveness of the seal strip.

20 Claims, 4 Drawing Sheets

TENSIONING STRAP FOR A TOP STACK SEAL

TECHNICAL FIELD

This disclosure relates to a tensioning apparatus for supporting a seal carried by the top stack of a convertible top or retractable hard top in an area where the seal would otherwise not be supported by a structural link or rail.

BACKGROUND

Convertible tops and retractable hardtops are moved between an extended position to cover the passenger compartment of a vehicle and a retracted position to provide an open air experience. The term "convertible top" as used in this disclosure should be construed to include soft top convertible tops and retractable hardtops. When a convertible top is extended, it is important that an effective seal is provided in every area where the top engages the vehicle body and windows. Seals are provided to exclude air and water from the passenger compartment when the top is extended.

In some areas around the periphery of the convertible top, seals may not be attached to a rail or a link that makes up part of the top stack. In particular, the sail area of the roof may be partially defined by the rear rail and five bow but gaps between these parts of the top stack leave areas where a seal is unsupported. A seal is less effective when not supported by a rigid support such as a rail and may allow leakage or wind noise in that area.

This disclosure is directed to solving the above problem and other problems as summarized below.

SUMMARY

According to one aspect of this disclosure, an apparatus for supporting a seal of a convertible top for a vehicle is disclosed that includes a support strap and a tensioner. The support strap has a first end attached to a first top stack part and a second end attached to a second top stack part. The support strap is flexible when the convertible top is retracted. The support strap is attached to an attachment portion of the seal to hold an engagement portion of the seal against the vehicle when the convertible top is extended. The tensioner is operatively connected between one of the top stack parts and the support strap to reduce the flexibility of the support strap between the first and second top stack parts when the convertible top is extended.

According to other aspects of this disclosure as it relates to the apparatus, the first top stack part is a rear rail that extends upwardly from the vehicle and the second top stack part is a rear bow that extends along a body surface of the vehicle. A retainer is attached to a lower end of the rear rail to hold the support strap at a corner defined by the rear rail and the rear bow to hold the seal against the vehicle. The support strap may be at least partially embedded in the seal or may be otherwise adhered to the seal.

The seal may define a plurality of slots in the attachment portion that extend transversely relative to a length of the support strap to facilitate bending the seal and the support strap. The support strap may be embedded in the seal and may extend across at least some of the slots.

The seal may be formed from a first elastomer composition that defines a body panel engaging portion and a second elastomer composition that defines the attachment portion. The second elastomer composition may be softer and more compressible than the first elastomer composition to facilitate bending the seal and the support strap. The support strap may be adhered to the attachment portion of the seal.

The seal and the support strap are provided in a portion of the convertible top that forms a corner of the convertible top. The apparatus may further comprise a retaining member attached at the corner that holds the flexible strap at the corner and applies a force on the seal to bias the seal into engagement with the vehicle. The force applied on the seal may be provided by a tensioner that may be a spring that is attached to a side tension cable.

According to other aspects of this disclosure, a convertible top is disclosed for a vehicle that defines a beltline of the vehicle and that includes a supporting strap that is tensioned by a spring to hold a seal against the vehicle at the beltline. The convertible top comprises a top stack linkage including a plurality of bows extending in a transverse direction and a plurality of articulated rails extending in a longitudinal direction that support the bows. The top stack linkage is movable between an extended position and a retracted position. A cover is supported by the linkage in the extended position and folded by the linkage in the retracted position. The supporting strap is attached to the top stack linkage and the spring selectively tensions the supporting strap by tightening the strap. The seal is provided between the supporting strap and the body at the beltline where the cover overlies the body and is tensioned by the spring to hold the seal against the body.

According to other aspects of this disclosure as it relates to the convertible top, the articulated rails may include a rear rail that extends upwardly from the body and the plurality of bows include a rear bow that extends along the beltline. A retainer may be attached to a lower end of the rear rail to retain the supporting strap and hold the supporting strap in line with the rear bow to hold the seal against the body. The supporting strap may be adhered to or partially embedded in the seal.

The seal of the convertible top may define a plurality of slots in an attachment portion that extend transversely relative to a length of the supporting strap and facilitate bending the seal and the supporting strap. The supporting strap may extend across at least some of the slots. Alternatively, the seal may be formed from a first elastomer composition that defines a body engaging portion and a second elastomer that defines an attachment portion that is more compressible than the first elastomer to facilitate bending the seal and the supporting strap.

The above aspects of this disclosure and other aspects will be described in detail below with references to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
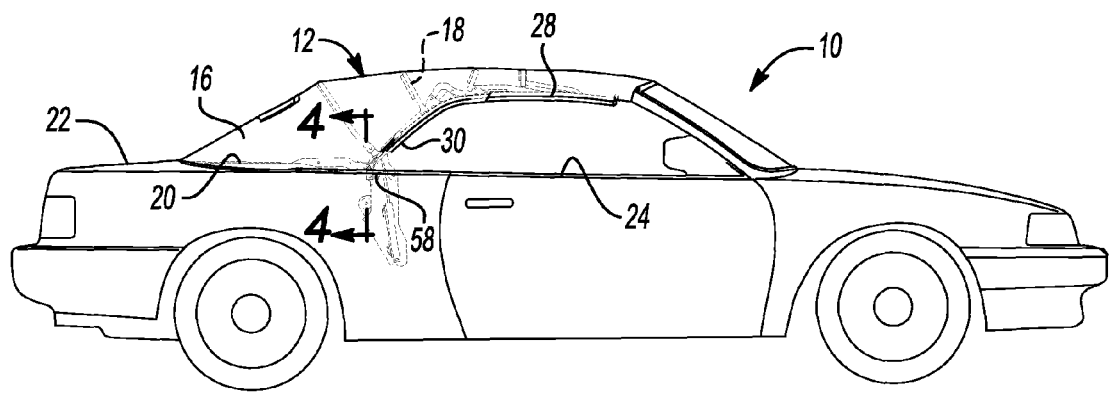
FIG. 1 is a side elevation view of a convertible vehicle.

Referring to FIG. 1, a vehicle 10 is illustrated that includes a convertible top 12. The convertible top 12 has a flexible textile cover 16 that is supported by a plurality of bows 18. One of the bows 18 is a rear bow 20 that extends along one or more outer body panels 22 at a belt line 24 of the vehicle 10. A plurality of top stack rails 28 support and move the cover 16 and the bows 18. One of the top stack rails is a rear rail 30.

Figure 2:
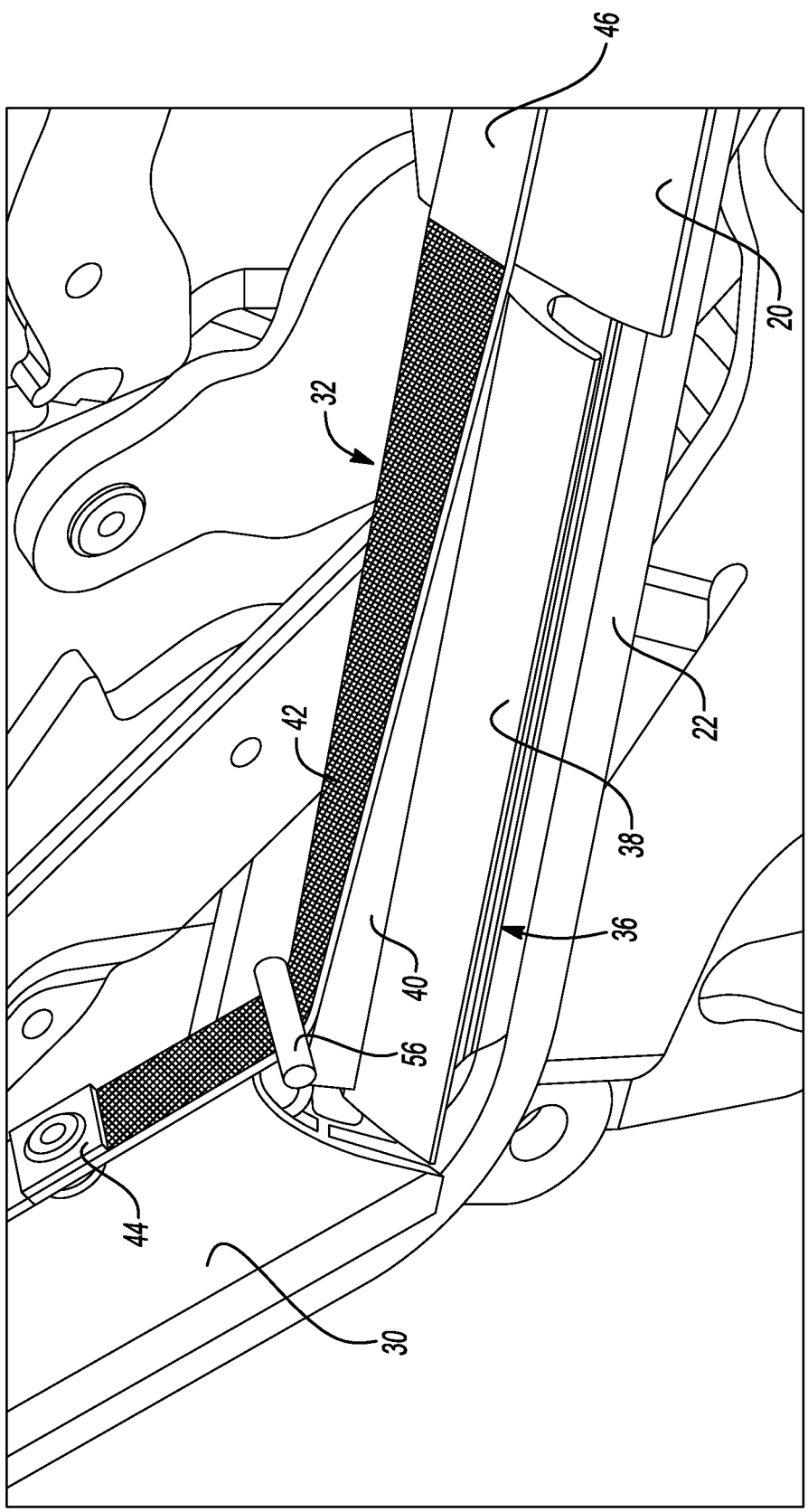
FIG. 2 is a fragmentary perspective view of one embodiment of a supporting strap for a seal made according to this disclosure.

Referring to FIG. 2, a seal assembly 32 is illustrated that includes a seal strip 36. The seal strip 36 includes a body panel engagement portion 38 and an attachment portion 40. The body panel engagement portion 38 engages the outer body panels 22. The support strap 42 is attached to or embedded in the attachment portion 40. The support strap 42 may be adhered to the surface of the attachment portion 40 or may be embedded within the attachment portion 40. The support strap 42 includes a first end 44 that is attached, directly or indirectly, to the rear rail 30 and a second end 46 that is attached, directly or indirectly, to the rear bow 20. A plurality of articulated top stack rails 28 support the bows 18 including the rear bow 20 (as shown in FIG. 1). The rear rail 30 extends upwardly from the belt line 24 of the vehicle 10 (as shown in FIG. 1) and also extends in the longitudinal direction. The rear rail 30 extends at an angle relative to the belt line 24 and is located behind the rearmost side window (not shown) of the vehicle 10.

Figure 3:
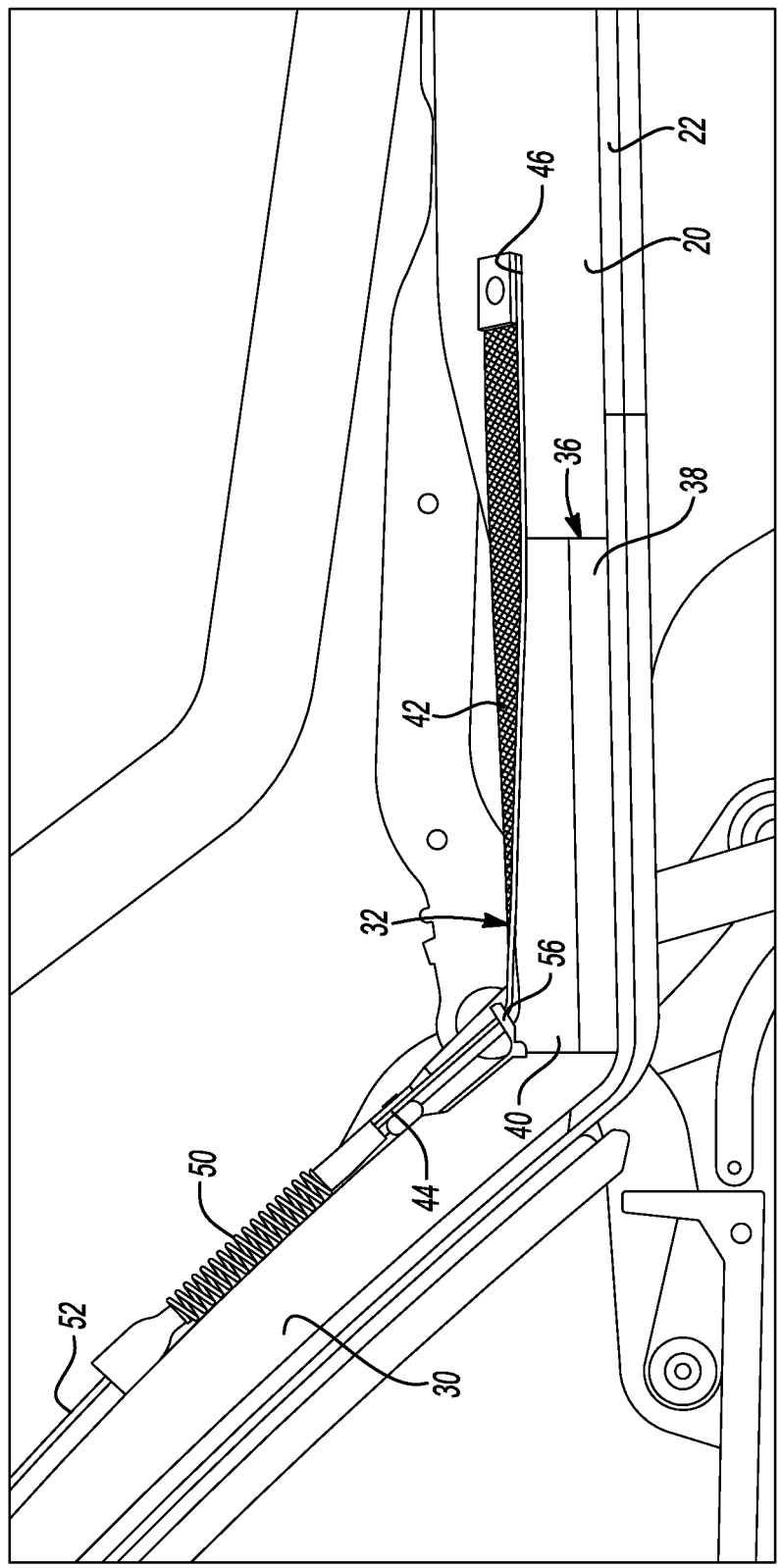
FIG. 3 is a fragmentary perspective view of another embodiment of a supporting strap and tensioner for a seal made according to this disclosure.

Referring to FIG. 3, an alternative embodiment of the seal assembly 32 is shown. The same reference numerals used to describe FIG. 2 are used to describe similar elements of the embodiments shown in FIG. 3. The seal assembly 32 includes a seal strip 36 including a body panel engagement portion 38 and an attachment portion 40. The attachment portion 40 is attached to the support strap 42 and the body panel engagement portion 38 is adapted to engage the body 22 of the vehicle 10. A first end 44 of the support strap 42 is attached directly or indirectly to a tensioner 50. The tensioner 50 may be a spring as shown or any other apparatus that can apply tension to the support strap 42. The spring, or tensioner 50, is attached to a side cable 52 that extends around part of the edge of the cover 16 of the convertible top 12 and is operatively attached to the rear rail 30. A retainer 56 is attached to the rear rail 30 and functions to hold the support strap 42 at an outside corner 58 of the convertible top 12. The retainer 56 may be a roller, a clip, a bar, or a ring that retains the support strap 42 in place, but also permits a limited degree of movement of the support strap 42 relative to the rear rail 30 and rear bow 20.

The tensioner 50 is secured at the first end 44 to the rear rail 30. Tension provided by the tensioner 50 holds the support strap 42 in a taut condition and causes the support strap 42 to exert a compressive force on the seal assembly 32. The seal assembly 32 is forced into engagement with the body panel 22 by the support strap 42.

Figure 4:
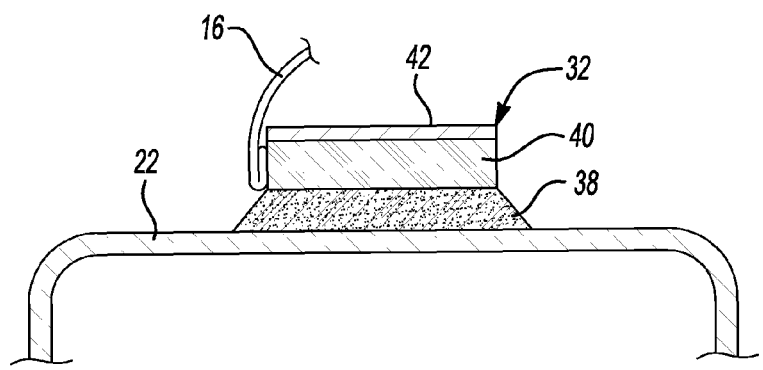
FIG. 4 is a cross-sectional view taken along the line 4-4 in FIG. 1.

Referring to FIG. 4, the seal assembly 32 is shown in cross-section. The seal assembly 32 is directly or indirectly attached to the cover 16. The seal assembly 32 includes the attachment portion 40 that is formed of a relatively soft, or compressible, elastomer. The softer elastomer used to form the attachment portion 40 facilitates bending the support strap 42 in the course of retracting the convertible top 12. The body panel engagement portion 38 is formed of a relatively hard, or less compressible, elastomer that is harder and less compressible than the body panel engagement portion 38.

The support strap 42 is a flexible and inelastic member that may be formed of nylon or another relatively rigid elastomer. The support strap 42 may also be formed of spring steel or any other material that becomes relatively rigid or less flexible when the tensioner 50 (shown in FIG. 3) tensions the support 42 in conjunction with moving the convertible top 12 from the retracted position to the extended position.

Figure 5:
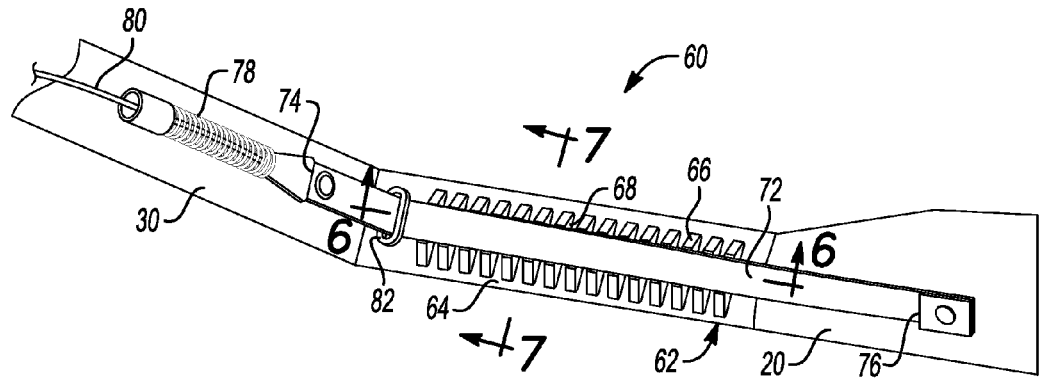
FIG. 5 is a fragmentary perspective view of another embodiment of a supporting strap and tensioner for a seal made according to this disclosure.

Referring to FIG. 5, an alternative embodiment of a seal assembly is generally indicated by reference numeral 60. The seal assembly 60 includes a seal 62 that includes a body panel engagement portion 64 and an attachment portion 66. The body panel engagement portion 64 is adapted to engage one or more of the outer body panels 22 (shown in FIG. 1). The attachment portion 66 is oriented to be secured to a support strap 72. The attachment portion 66 includes a plurality of slots 68 that are provided to facilitate bending the support strap 72 as the convertible top 12 is retracted.

A first end 74 of the support strap 72 is attached through a tensioner 78, directly or indirectly, to a side cable 80. A second end 76 of the support strap 72 is attached, directly or indirectly, to the rear bow 20. A gap defined between the rear bow 20 and rear rail 30 is spanned by the support strap 72 and seal strip 62.

A retainer 82 secures the tensioner 72 near an outside corner 58 (shown in FIG. 1) of the convertible top 12 where the rear rail 30 extends toward the belt line 24. The seal assembly 60 extends between the rear rail 30 and the rear bow 20 at the corner 58. The seal extends across the gap between the rear bow 20 and rear rail 30 and is not backed by either the rear bow 20 and rear rail 30 in the gap when the top is extended.

Figure 6:
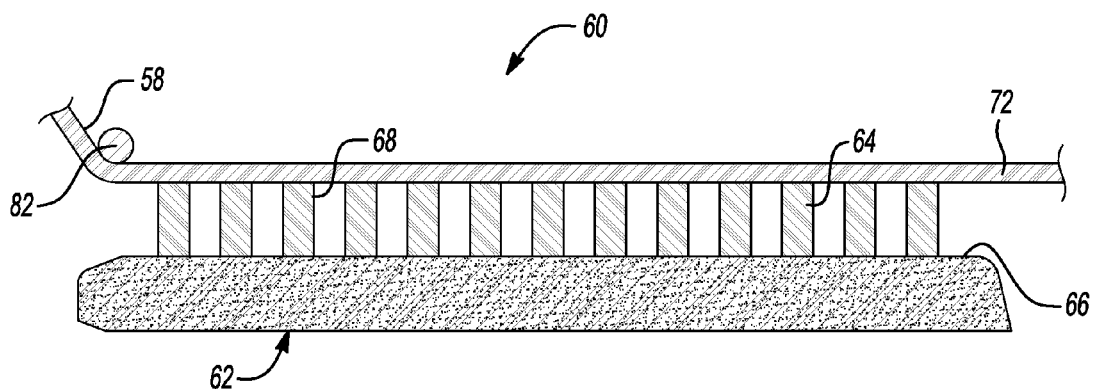
FIG. 6 is a cross-sectional view taken along the line 6-6 in FIG. 5.

Referring to FIG. 6, the structure of the seal assembly is shown in a longitudinal cross-section. The seal assembly 60 includes the seal strip 62 that includes a first portion 64 that may have a higher hardness and is less compressible than a second portion of the seal 66. Alternatively, the hardness and compressibility of the first and second portions 64 and 66 may be the same because the slots 68 formed in the first portion of the seal 64 may function to make it easier to bend. The slots 68 facilitate bending the seal assembly 60 during the folding and unfolding of the convertible top 12. The seal strip 62 is backed-up by the support strap 72. The support strap 72 is held in position by the retainer 82 near the corner 58 formed at the bottom of the rear rail 30.

Figure 7:
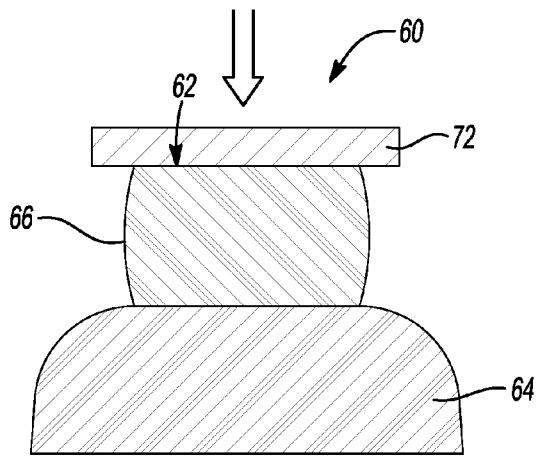
FIG. 7 is a cross-sectional view taken along the line 7-7 in FIG. 5.

Referring to FIG. 7, a transverse cross-section of the seal assembly 60 is shown in which the seal strip 62 includes a first portion 64 that engages the vehicle 10 at the belt line 24 (as shown in FIG. 1) and a second portion 66. The support strap 72 may be embedded in the second portion of the seal 66 in an in situ molding process. Alternatively, the support strap 72 may be adhered or otherwise attached to the seal strip 62.

The embodiments described above are specific examples that do not describe all possible forms of this disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An apparatus for supporting a seal of a convertible top for a vehicle comprising:
a support strap having a first end attached to a first top stack part and a second end attached to a second top stack part, wherein the support strap is flexible when the convertible top is retracted, and wherein the support strap is attached to an attachment portion of the seal to hold an engagement portion of the seal against the vehicle when the convertible top is extended; and
a tensioner operatively connected between one of the top stack parts and the support strap to reduce the flexibility of the support strap between the first and second top stack parts when the convertible top is extended.

2. The apparatus of claim 1 wherein the first top stack part is a rear rail that extends upwardly from the vehicle and the second top stack part is a rear bow that extends along a body surface of the vehicle.

3. The apparatus of claim 2 wherein a retainer is attached to a lower end of the rear rail to hold the support strap at a corner defined by the rear rail and the rear bow to hold the seal against the vehicle.

4. The apparatus of claim 1 wherein the support strap is at least partially embedded in the seal.

5. The apparatus of claim 1 wherein the seal defines a plurality of slots in the attachment portion that extend transversely relative to a length of the support strap and facilitate bending the seal and the support strap.

6. The apparatus of claim 5 wherein the support strap is embedded in the seal and extends across at least some of the slots.

7. The apparatus of claim 1 wherein the seal is formed from a first elastomer composition that defines a body panel engaging portion and a second elastomer composition that defines the attachment portion, wherein the second elastomer composition is softer and more compressible than the first elastomer composition to facilitate bending the seal and the support strap.

8. The apparatus of claim 1 wherein the support strap is adhered to the attachment portion of the seal.

9. The apparatus of claim 1 wherein the seal and the support strap are provided in a portion of the convertible top that forms a corner of the convertible top, and further comprising a retaining member attached at the corner that holds the flexible strap at the corner and applies a force on the seal to bias the seal into engagement with the vehicle.

10. The apparatus of claim 1 wherein the tensioner is a spring that is attached to a side tension cable.

11. A convertible top for a vehicle having a body that defines a beltline of the vehicle, the convertible top comprising:
a top stack linkage including a plurality of bows extending in a transverse direction and a plurality of articulated rails extending in a longitudinal direction that support the bows, wherein the linkage is movable between an extended position and a retracted position;
a cover supported by the linkage in the extended position and folded by the linkage in the retracted position;
a supporting strap attached to the top stack linkage;
a biasing apparatus that selectively tensions the supporting strap by tightening the strap, and
a seal provided between the supporting strap and the body at the beltline where the cover overlies the body, wherein the supporting strap is tensioned by the biasing apparatus to hold the seal against the body.

12. The convertible top of claim 11 wherein the articulated rails include a rear rail that extends upwardly from the body and the plurality of bows include a rear bow that extends along the beltline.

13. The convertible top of claim 12 wherein a retainer is attached to a lower end of the rear rail and the supporting strap is retained by the retainer to hold the seal against the body.

14. The convertible top of claim 11 wherein the supporting strap is adhered to the seal.

15. The convertible top of claim 11 wherein the seal defines a plurality of slots in an attachment portion that extend transversely relative to a length of the supporting strap and facilitate bending the seal and the supporting strap.

16. The convertible top of claim 15 wherein the supporting strap is at least partially embedded in the seal and extends across at least some of the slots.

17. The convertible top of claim 11 wherein the seal is formed from a first elastomer composition that defines a body engaging portion and a second elastomer that defines an attachment portion, wherein the second elastomer is more compressible than the first elastomer to facilitate bending the seal and the supporting strap.

18. The convertible top of claim 17 wherein the supporting strap is adhered to the attachment portion of the seal.

19. The convertible top of claim 11 wherein the seal and the support strap are provided in a portion of the convertible top that forms an outside corner of the convertible top, and further comprising a retention clip attached at the corner that holds the support strap and applies a force on the seal to bias the seal into engagement with the body.

20. The convertible top of claim 11 wherein the biasing apparatus is a spring that is attached to a side tension cable.

* * * * *